United States Patent [19]

Stucke

[11] 4,109,924
[45] Aug. 29, 1978

[54] STEPPED JOINT PISTON RING

[75] Inventor: Charles G. Stucke, Lexington, Ky.

[73] Assignee: Chemprene, Inc., Alden, N.Y.

[21] Appl. No.: 704,463

[22] Filed: Jul. 12, 1976

[51] Int. Cl.² .................................................. F16J 9/14
[52] U.S. Cl. ..................................... 277/165; 277/218;
 277/220; 277/223
[58] Field of Search ............... 277/165, 223, 220, 218,
 277/155, 221, 216

[56] References Cited

U.S. PATENT DOCUMENTS

| 2,738,243 | 3/1956 | Sawyer | 277/219 |
| 2,877,071 | 3/1959 | Arnot | 277/165 |
| 3,751,047 | 8/1973 | McGee | 277/216 |

FOREIGN PATENT DOCUMENTS 515,230 11/1939 United Kingdom ..................... 277/220

Primary Examiner—Richard E. Aegerter
Assistant Examiner—L. Footland
Attorney, Agent, or Firm—Lockwood, Dewey, Alex & Cummings

[57] ABSTRACT

A sealing assembly especially adapted for hydraulic applications including a first seal ring of one-piece construction having overlapping ends, one of which is provided with an elastomeric portion which is compressed in use both radially and axially. A resilient back up seal urges the outer ring into close contact with the sealed surface and cooperates with the elastomeric portion of the first seal ring to provide efficient and effective sealing under high pressure static and dynamic applications.

8 Claims, 13 Drawing Figures

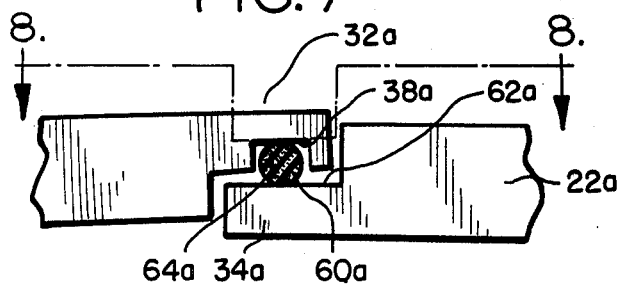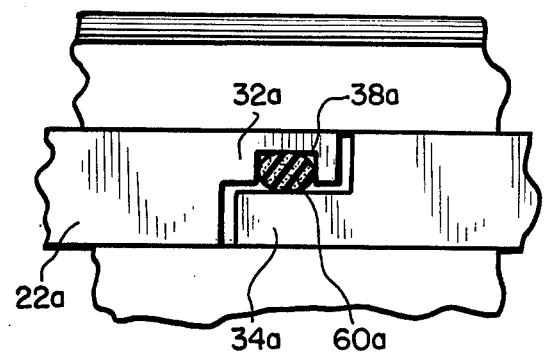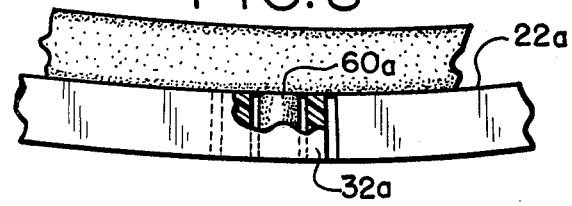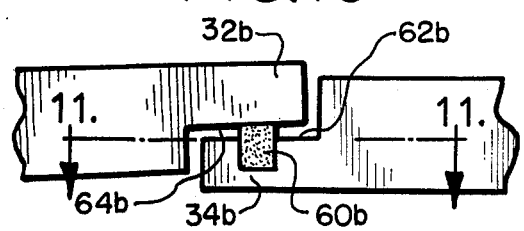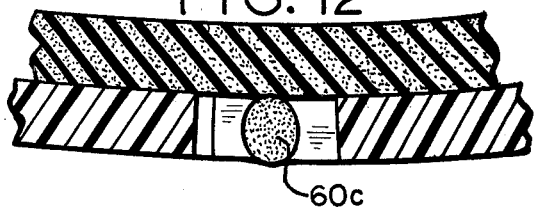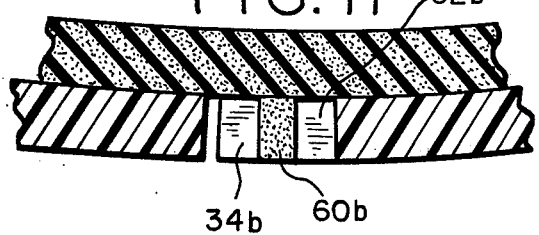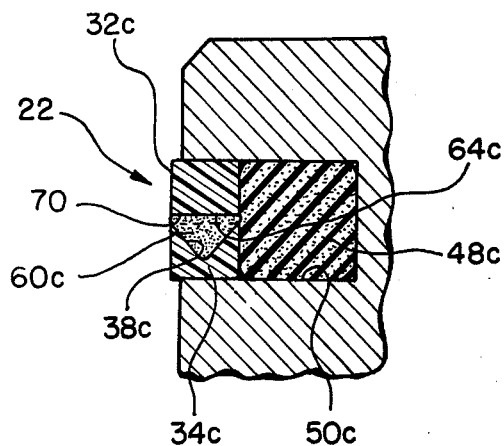

STEPPED JOINT PISTON RING

BACKGROUND AND DESCRIPTION OF THE INVENTION

The present invention generally relates to sealing devices and, more particularly, to step joint rings or packings adapted for use within annular grooves in a piston, rod or the like. In this regard, an important embodiment of the present invention is particularly directed to step joint piston ring seals adapted for use in piston and cylinder assemblies used in high pressure hydraulic applications.

The use of step joint piston rings, that is, piston rings which have a one-piece split construction wherein the ring ends are stepped and overlay one another, is well known. In the past, leakage through the gap in these rings has been solved by employing various joint configurations. High demands on these seals, such as, for example, in hydraulic sealing applications wherein a broad range of pressures and temperatures are involved, has resulted in joint and other leakage problems which could not be fully met by the previously employed joint configuration solutions.

In a preferred form, the sealing device of the present invention comprises an outer, relatively stiff ring and an inner resilient back up ring adapted to urge the outer ring into contact with the cylindrical surface in which the piston or rod reciprocates. According to the invention, a particular form of end gap seal is provided which insures maintenance of the high pressure seal under severe conditions. The relatively stiff outer ring is of regular, preferably rectangular, cross section and includes any of various forms of end gap seal.

As noted above, reciprocating rods, pistons, or plungers driven under high forces within fluid containing cylinders present serious sealing problems. Seal rings used to seal such rods, pistons and plungers (referred to hereinafter for convenience as piston rings) must prevent passage of fluid from the high pressure or sealed region into the low pressure of exterior region, without utilizing unduly high radial biasing forces which would cause excessive friction between the cylinder wall and the axially extending, radially outwardly directed exterior surface ring. Likewise, these rings must resist cocking or flutter under pressure changes. Preferably, materials must be used which provide a suitably low coefficient of friction with respect to the cylinder or other sealed surface. Piston rings of the type in question should also be able to seal effectively at high static pressures as well as at low pressures, and ideally must not be dependent upon the extent of sealed pressure to develop primary sealing forces. As used herein, "primary" sealing refers to the seal existing between relatively movable parts, such as the outside surface of the piston ring and the cylinder, while "secondary" refers to the seal between parts which undergo little or no relative motion, for example, the piston ring and/or the back up ring with respect to the piston, particularly, the ring groove thereof.

These objectives are achieved by the gapped piston ring seals of the present invention which include an end gap seal and resilient back up combination wherein the ring ends overlap one another with one end of the reduced sized portions thereof having an elastomeric insert which is compressed in use both radially and axially, and which, in a preferred embodiment, includes surfaces which contact at least the sealed surface (e.g. cylinder wall) itself and the resilient back up ring. It will be understood that, as used herein, "outer" is used in the sense of being the part closest to the primary seal band or area swept by the seal. The principles of the invention, however, may also apply to certain constructions wherein the sealing ring is urged inwardly towards the sealed surface rather than outwardly toward it.

In view of the still existing need for improved seals, particularly seals used in difficult applications, an object of the present invention is to provide an improved seal or packing for variable pressure applications.

Another object is to provide an improved seal for a piston, rod, or the like.

Another object is to provide an improved seal which includes an outer, relatively stiff seal ring and an inner elastomeric or spreader ring which acts to urge the outer ring into close contact with the sealed surface, and particularly, to provide such a piston ring with an improved end gap seal.

A still further object is to provide a piston or rod seal in which the relatively stiff portion thereof contains an end gap seal which includes a pair of overlapping, oppositely directed end portions of reduced axial extent, with one of said portions including an elastomeric end gap seal member adapted to provide an axially directed secondary seal with the other end part in which the elastomeric part is also acted upon radially by the back up ring, with the end seal part having an outer surface directly engaging the cylinder or other surface to be sealed.

The foregoing objects and advantages of the invention are achieved by providing a sealing assembly which includes a relatively stiff first seal ring with a surface for engaging a counterpart surface to be sealed, additional axial end surfaces for engaging the groove in the member receiving the assembly, and a second, resilient back up seal adapted for reception in the groove and acting radially on the first ring, with the first ring having an end seal comprised of circumferentially overlapping end portions of reduced axial size, one of the reduced size end portions including a third or end gap seal element which provides a secondary seal between the two reduced size end portions and which is engaged on one of its radially directed surface portions by the surface to be sealed and by the resilient back up ring on the radially opposite surface thereof.

End gap seals in relatively stiff rings have been a continuing problem in piston, rod and like seals. This is because, with stiff ring materials, provision must be made for expanding the ring over the piston as well as for allowing circumferential growth or shrinkage due to wear, or to thermal or other dynamic factors. While elastomeric rings may be stretched to snap into the ring grooves, and do not have a problem of circumferential growth or shrinkage, elastomers themselves do not have the mechanical properties necessary to provide a highly effective, low friction seal.

The exact manner in which these objects and advantages are achieved in practice will become more clearly apparent when reference is made to the following detailed description of the preferred embodiments of the invention set forth by way of example and shown in the accompanying drawings, in which like reference numerals indicate corresponding parts throughout the several figures and wherein:

FIG. 7 is a side elevational view of another form of ring end gap seal, taken before assembly thereof;

FIG. 8 is a horizontal view, partly in plan and partly in section, showing certain parts of the end gap seal construction of FIG. 7 with portions thereof broken away;

FIG. 9 is a side elevational view of the ring end gap seal of FIGS. 7 and 8 showing the seal in the installed position of use;

FIG. 10 is a side elevational view of another form of ring end gap seal, taken before assembly thereof;

FIG. 11 is a horizontal sectional view of the seal of FIG. 10 taken along lines 11—11 thereof;

FIG. 12 is a horizontal sectional view of a still further form of ring end gap seal; and FIG. 13 is a vertical sectional view of the end gap seal of FIG. 12, taken in a direction looking circumferentially along the primary seal ring.

While seals of the invention may be used in different environments, a description of the invention will be made with respect to various forms of seals adapted for use as piston rings in piston and cylinder assemblies used in high pressure oil hydraulic applications.

Figure 1:
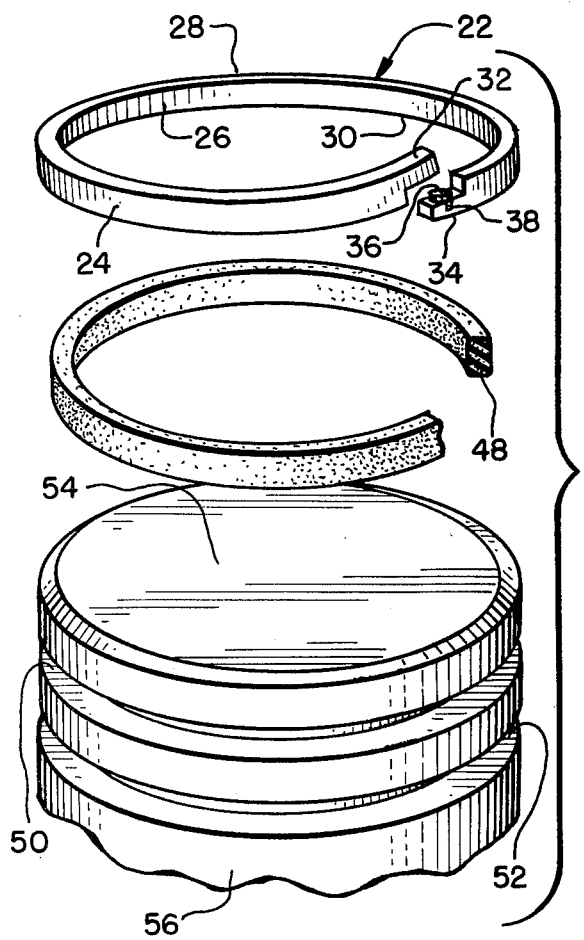
FIG. 1 is an exploded perspective view of one embodiment of the invention, showing a stiff outer ring, a resilient inner or back up ring and a grooved piston for receiving the ring assembly.
Figure 3:
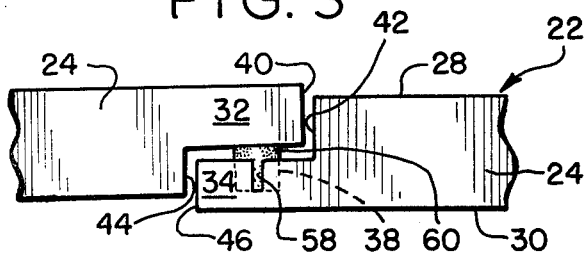
FIG. 3 is an enlarged fragmentary side elevational view of the end gap seal of the ring shown in FIGS. 1 and 2, taken before assembly thereof.

Referring now to the drawings in greater detail, FIG. 1 shows a piston and seal ring assembly generally designated 20 to include an outer, stiff but resilient piston ring 22 of generally annular shape. The ring includes an axially extending, radially outwardly directed primary sealing surface 24, an oppositely directed inner surface 26, and a pair of oppositely directed axial surfaces 28, 30 (FIG. 3). The outer ring 22 includes a pair of reduced size end portions 32, 34, the lower of which is shown to include an end gap seal member 36 disposed within a pocket or well 38 in the end 34. The ring end gap itself lies between the circumferentially oppositely directed pairs of surfaces 40, 42 and 44, 46.

FIG. 1 also shows the assembly 20 to include an O-ring 48 which, in the illustrated embodiment, is of oval cross-section and which is made from an elastomeric material and adapted to be received within the grooves 50, 52 which are spaced axially downwardly from the top or thrust receiving surface 54 of the piston 56. It will, of course, be appreciated that O-rings of other than oval cross-section may be used in the assembly 20. While FIG. 1 shows only one ring assembly for purposes of illustration which is sufficient for most applications, it will also be appreciated that if more than one groove is present, each such groove will normally be provided with a ring assembly. It should be understood, however, that in most applications, a single groove and ring assembly of the present invention will be sufficient to provide effective sealing.

Figure 2:
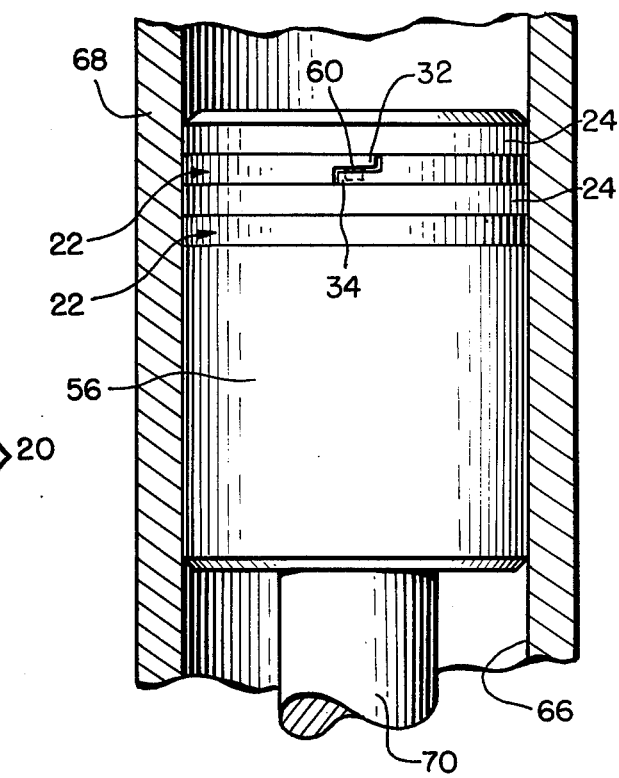
FIG. 2 is a view of the piston and ring assembly of FIG. 1 shown disposed within a circular cylinder shown in cross section.

FIG. 2 shows the piston 56 received within a cylinder 68 having an inwardly directed cylinder wall 66 which engages the outer surfaces 24 of the ring assembly 22. An actuator rod 70 is affixed to the base of the piston 56.

Figure 4:
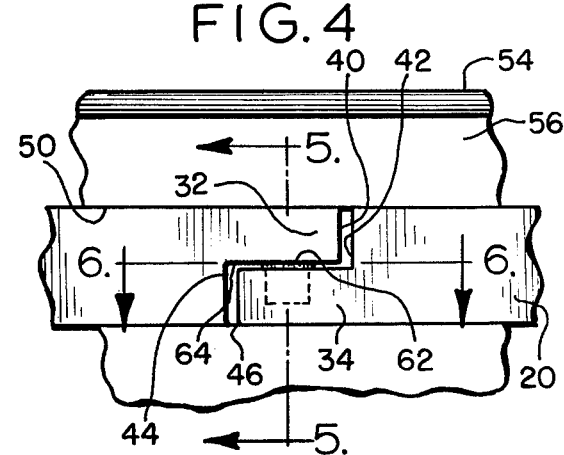
FIG. 4 is an enlarged fragmentary side elevational view of the end gap seal portion of a modified version the ring shown in FIGS. 1–3, illustrating the same in a position of use within an associated piston.
Figure 5:
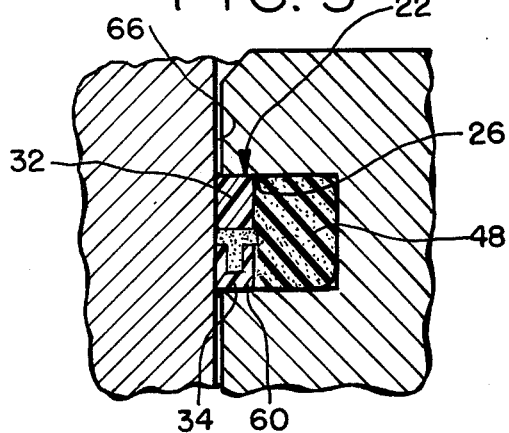
FIG. 5 is a vertical sectional view of the end gap seal assembly of FIGS. 1–4, taken along lines 5—5 of FIG. 4.

Referring again to FIG. 3, the primary ring assembly is shown before insertion thereof into the groove 50. FIG. 3 also shows that a pocket or well 38 of circular cross section is cut axially in the lower reduced end portion 34 of the ring 22. In the illustrated embodiment, an aperture 58 is provided in the outer surface 24 of the ring end 34 thus permitting a portion of the end gap seal member 60 to project thereto. It will be appreciated, however, that such aperture is not essential to the present invention and that, alternatively and as illustrated in FIGS. 4 and 5, a thin web or wall of ring material can be present in place thereof, providing such web or wall is sufficiently flexible so that, upon being acted upon by the radially directed forces from the end gap sealing member 60, it will contact, in fluid tight sealing engagement, the inwardly directed cylinder wall 66. The end gap seal member 60 is preferably in the form of a small elastomeric cylinder having an end portion thereof extending axially outwardly of the well 38 by a small amount, for example, 0.010 inches, in the uncompressed condition of the cylinder 60.

FIG. 4 shows that with the ring 24 in place in the groove 50 the upper surface of the cylindrical end seal member 60 contacts the lower surface 64 of the ring end 32 in fluid-tight relation. In the illustrated embodiment, as best shown in FIG. 4, the mutually opposed pairs of end surfaces 40, 42 and 44, 46 are slightly spaced apart, however, if desired, such end surfaces may be in contact with each other to an extent that the ring 24 is slightly compressed when installed in the groove 50. The extent to which there is a gap present between surfaces 40, 42 and 44, 46 will normally be determined by tolerances, temperature conditions and the nature of the application as well as other factors apparent to those skilled in this art.

FIG. 5 shows that the O-ring 48 engages both the inner surface 26 of the primary ring 22 as well as the inner surface of the end gap seal 60. Accordingly, it will be appreciated that the back up ring 48 creates a radial compressive load which acts directly through the end seal 60 to the cylinder wall 66 as well as through all portions of the outer ring 22.

Figure 6:
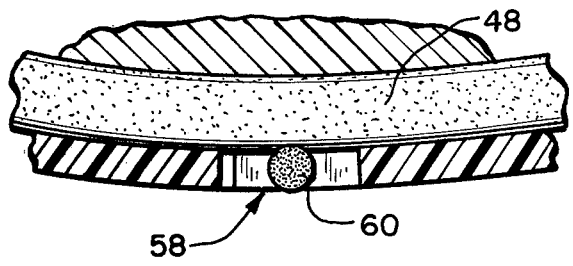
FIG. 6 is a horizontal sectional view of the ring end gap seal of FIGS. 1–5, taken along lines 6—6 of FIG. 4.

FIG. 6 shows the engagement between the inner surface of the end gap seal 60 and the back up ring 48 as well as the exposure of a small part of the seal 60 through the aperture 58.

Referring now to FIGS. 7, 8 and 9, a form of the invention is shown in which the groove or pocket 38a extends radially and is of rectangular cross section. The end gap or third seal member 60a is also of cylindrical configuration; however, in the embodiment of FIG. 7 the cylinder access extends radially. A tight seal is created when the ends 32a, 34a compress the seal 60a, at which time the oppositely directed surfaces 62a, 64a are spaced apart by only a small working clearance. The clearances are shown exaggerated in FIG. 9 for clarity.

FIGS. 10 and 11 show a form of end gap seal similar to that of FIGS. 7–9 except that the end gap or third seal member 60b is a square or rectangular configuration. The seal unit 60b creates an effective seal between oppositely directed surfaces 62b, 64b of the ends 32b, 34b, and the two radial ends of the seal 60b are engaged respectively by the back up ring and the cylinder wall or other surface to be sealed.

FIG. 12 shows an embodiment wherein the seal unit 60c is of conical configuration and is received within a conical pocket 38c in the lower end 34c of the ring 22. The downwardly directed surface 64c of the upper ring end 32c engaged the upper surface of the elastomeric seal body 60c. The back up ring 48c is disposed in the groove 50c and is shown to act radially on the conical seal body 60c to urge its outermost edge 70 toward the surface to be sealed.

Referring now to the materials used, in one form of the invention, the outer ring 22 may be a fiberglass-filled nylon (polyamide) material. The back up ring 48 and the third seal unit are synthetic rubbers such as, for example, nitrile rubbers. Other suitable material or synthetic elastomers may be substituted for the nitrile rubbers, as indicated by the requirements of the application.

The ring 22 may likewise be made from other synthetic resinous forms of material. The exact materials used are not critical to the practice of the invention, provided only that they function in use as described herein.

It will thus be seen that the present invention provides new and useful sealing assemblies and thus achieves the objects set out specifically herein and other inherent objects and advantages. It is apparent that modifications and variations of the described embodiments of the invention will be apparent to those skilled in the art and it is therefore contemplated that such changes may be made without departing from the spirit of the invention or the scope of the appended claims.

I claim:

1. A sealing assembly comprising, in combination, a relatively stiff but resilient first seal ring having at least one surface for engaging a counterpart surface to be sealed, said first seal ring having axial end surfaces, a second, resilient back up seal adapted to act radially on said first ring to urge it toward said counterpart surface to be sealed, said first ring having an end seal assembly comprised of circumferentially overlapping end portions of reduced axial extent, said overlapping end portions defining first and second axially opposed seal ring surfaces, one of said circumferentially overlapping end portions including a generally axially directed pocket, a third seal element of a resilient material, said third seal element being in said pocket and engaged between said first and second axially opposed seal ring surfaces, thereby providing a secondary seal between said first and second axially opposed seal ring surfaces of said first seal ring.

2. A sealing assembly as defined in claim 1 wherein at least a portion of the radially outwardly directed surface of said third seal element is structured for engaging a surface to be sealed.

3. A sealing assembly as defined in claim 1 in which said third seal element is in the form of a cylinder, and said pocket is generally cylindrical and includes inner and outer, generally radially directed openings therein, thus permitting said third seal element to be engaged respectively by said back up ring and a surface to be sealed.

4. A sealing assembly as defined in claim 1 in which said third seal element is in the form of a cylinder, and said pocket is generally rectangular and includes inner and outer, generally radially directed openings therein, thus permitting said third seal element to be engaged respectively by said back up ring and a surface to be sealed.

5. A sealing assembly as defined in claim 1 in which said third seal element is in the form of a block of rectangular cross section, and said pocket is generally rectangular and includes inner and outer, generally radially directed openings therein, thus permitting said third seal element to be engaged respectively by said back up ring and a surface to be sealed.

6. A sealing assembly as defined in claim 1 in which said third seal element is in the form of a conical member, and said pocket is generally conical and permits said third seal element to be engaged respectively by said back up ring and a surface to be sealed.

7. A sealing assembly as defined in claim 1 wherein at least a portion of the radially inwardly directed surface of said third seal element is structured for engaging said second, resilient back up seal.

8. In combination, a piston, cylinder and seal assembly, said piston having at least one seal-receiving groove therein, a resilient, annular back up second seal ring disposed within said groove, and a relatively stiff but resilient first seal ring disposed within said groove and radially overlying said back up ring, said first seal ring having at least one surface engaging an inner surface of said cylinder, said first ring having an end seal assembly comprised of circumferentially overlapping end portions of reduced axial extent, said overlapping end portions defining first and second axially opposed seal ring surfaces, a third seal element of a resilient material, said third seal element being engaged on one of its radially directed surface portions by said inner surface of said cylinder and by said resilient back up second ring on the radially opposite surface thereof, said third seal element being further engaged between said first and second axially opposed seal ring surfaces, thereby providing a secondary seal between said first and second axially opposed seal ring surfaces of said first seal ring.

* * * * *

UNITED STATES PATENT AND TRADEMARK OFFICE
CERTIFICATE OF CORRECTION

PATENT NO. : 4,109,924
DATED : August 29, 1978
INVENTOR(S) : Charles G. Stucke

It is certified that error appears in the above-identified patent and that said Letters Patent are hereby corrected as shown below:

Column 1, line 42, "of" should read --or--

Signed and Sealed this

Seventeenth Day of June 1980

[SEAL]

Attest:

Attesting Officer

SIDNEY A. DIAMOND

Commissioner of Patents and Trademarks